United States Patent
Aratani et al.

(10) Patent No.: US 12,410,497 B2
(45) Date of Patent: Sep. 9, 2025

(54) ELECTRIC-RESISTANCE-WELDED STEEL PIPE OR TUBE FOR HOLLOW STABILIZER

(71) Applicant: JFE STEEL CORPORATION, Tokyo (JP)

(72) Inventors: Masatoshi Aratani, Tokyo (JP); Kazutoshi Ishikawa, Tokyo (JP); Ryoji Matsui, Tokyo (JP); Tomonori Kondou, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 665 days.

(21) Appl. No.: 17/595,254

(22) PCT Filed: May 12, 2020

(86) PCT No.: PCT/JP2020/019015
§ 371 (c)(1),
(2) Date: Nov. 12, 2021

(87) PCT Pub. No.: WO2020/230795
PCT Pub. Date: Nov. 19, 2020

(65) Prior Publication Data
US 2022/0307117 A1 Sep. 29, 2022

(30) Foreign Application Priority Data
May 13, 2019 (JP) ................. 2019-090627

(51) Int. Cl.
*C22C 38/58* (2006.01)
*B23K 35/30* (2006.01)
(Continued)

(52) U.S. Cl.
CPC .......... *C22C 38/58* (2013.01); *B23K 35/3073* (2013.01); *C21D 3/04* (2013.01);
(Continued)

(58) Field of Classification Search
CPC ....... C22C 38/58; C22C 38/005; C22C 38/02; C22C 38/42; C22C 38/04; C22C 38/06;
(Continued)

(56) References Cited

U.S. PATENT DOCUMENTS 10,167,538 B2   1/2019   Kiyota et al.
11,085,099 B2   8/2021   Yoshioka et al.
(Continued)

FOREIGN PATENT DOCUMENTS

CN   104395487 A   3/2015
EP     2857537 A1   4/2015
(Continued)

OTHER PUBLICATIONS

Feb. 17, 2023, Office Action issued by the China National Intellectual Property Administration in the corresponding Chinese Patent Application No. 202080035327.6 with English language concise statement of relevance.
(Continued)

*Primary Examiner* — Anthony M Liang
(74) *Attorney, Agent, or Firm* — KENJA IP LAW PC

(57) ABSTRACT

Provided is an electric-resistance-welded steel pipe or tube for a hollow stabilizer where the formation of not only a ferrite decarburized layer but also a total decarburization layer can be suppressed even when heat treatment is performed in the air. The electric-resistance-welded steel pipe or tube for a hollow stabilizer has a predetermined chemical composition, and the depths of total decarburized layers on an inner surface and on an outer surface are 100 μm or less.

4 Claims, 1 Drawing Sheet

(51) Int. Cl.
    *C21D 3/04*     (2006.01)
    *C22C 38/00*     (2006.01)
    *C22C 38/02*     (2006.01)
    *C22C 38/42*     (2006.01)
    *C22C 38/44*     (2006.01)
    *C22C 38/46*     (2006.01)
    *C22C 38/48*     (2006.01)
    *C22C 38/50*     (2006.01)
    *C22C 38/54*     (2006.01)
    *B23K 103/02*     (2006.01)

(52) U.S. Cl.
    CPC .......... *C22C 38/002* (2013.01); *C22C 38/005* (2013.01); *C22C 38/02* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *B23K 2103/02* (2018.08)

(58) Field of Classification Search
    CPC ... C22C 38/008; C22C 38/38; B23K 35/3073; C21D 3/04; C21D 9/08
    See application file for complete search history.

(56) References Cited

U.S. PATENT DOCUMENTS

| | | | |
|---|---|---|---|
| 2012/0070682 A1 | 3/2012 | Hatano et al. | |
| 2015/0176101 A1* | 6/2015 | Ishitsuka | C22C 38/002 |
| | | | 148/504 |
| 2020/0071784 A1* | 3/2020 | Yoshioka | C23G 1/081 |
| 2021/0277507 A1 | 9/2021 | Aratani et al. | |

FOREIGN PATENT DOCUMENTS

| | | | | |
|---|---|---|---|---|
| EP | 3399064 A1 | 11/2018 | | |
| JP | 2007056283 A | 3/2007 | | |
| JP | 2007270349 A | 10/2007 | | |
| JP | 2014019908 A | 2/2014 | | |
| JP | 2018003114 A | 1/2018 | | |
| JP | 6308334 B2 * | 4/2018 | ............ | C21D 6/002 |
| KR | 1020120010261 A | 2/2012 | | |
| WO | 2013175821 A1 | 11/2013 | | |
| WO | 2015118610 A1 | 8/2015 | | |
| WO | 2017141952 A1 | 8/2017 | | |
| WO | 2018079398 A1 | 5/2018 | | |

OTHER PUBLICATIONS

Aug. 8, 2023, Office Action issued by the Korean Intellectual Property Office in the corresponding Korean Patent Application No. 10-2021-7039843 with English language concise statement of relevance.

Mar. 1, 2022, the Extended European Search Report issued by the European Patent Office in the corresponding European Patent Application No. 20805183.9.

Aug. 26, 2022, Office Action issued by the Canadian Intellectual Property Office in the corresponding Canadian Patent Application No. 3,139,909.

Sep. 26, 2022, Office Action issued by the China National Intellectual Property Administration in the corresponding Chinese Patent Application No. 202080035327.6 with English language search report.

Jul. 21, 2020, International Search Report issued in the International Patent Application No. PCT/JP2020/019015.

Oct. 12, 2021, Notification of Reasons for Refusal issued by the Japan Patent Office in the corresponding Japanese Patent Application No. 2020-550185 with English language Concise Statement of Relevance.

* cited by examiner

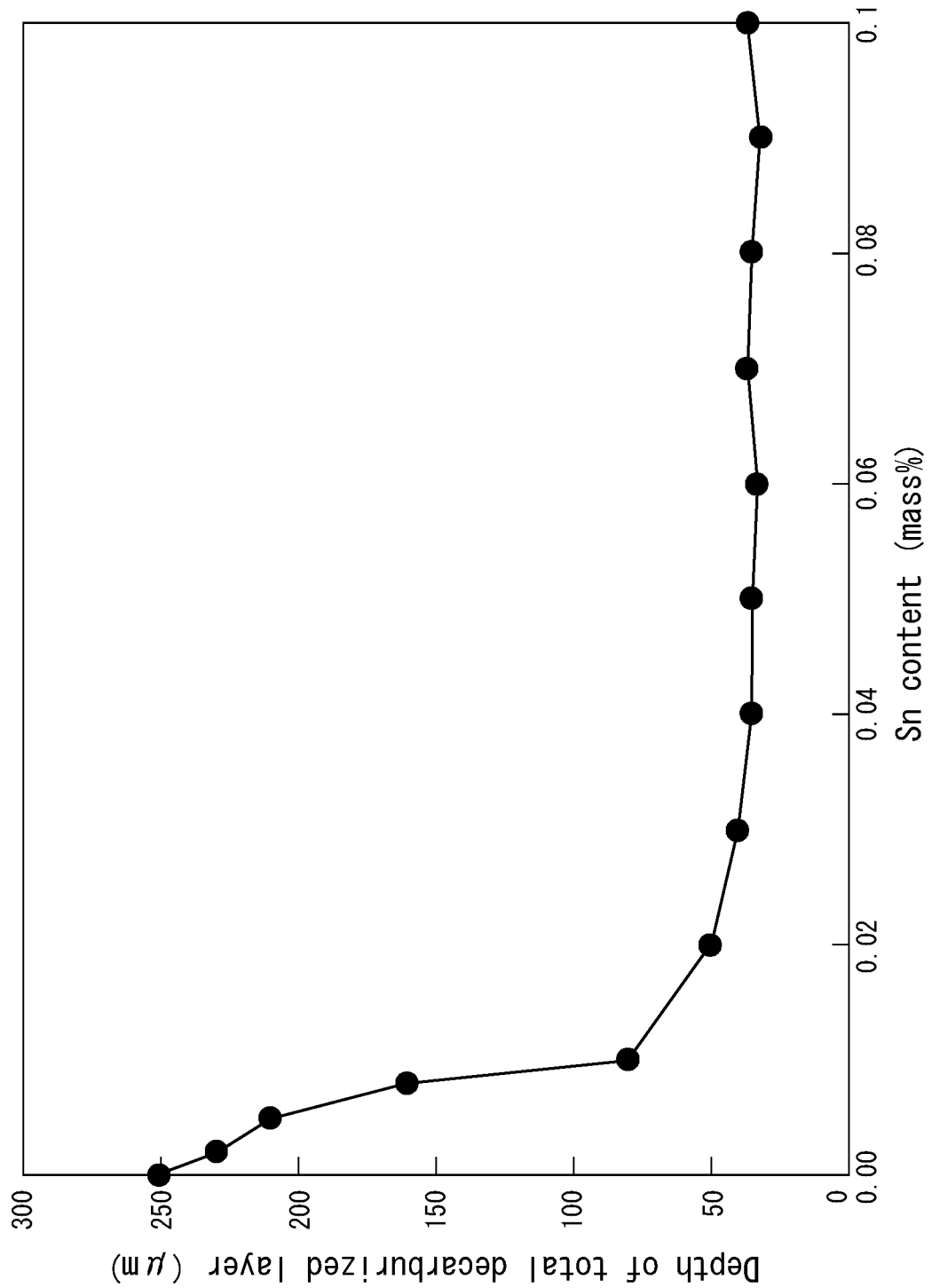

ELECTRIC-RESISTANCE-WELDED STEEL PIPE OR TUBE FOR HOLLOW STABILIZER

TECHNICAL FIELD

This disclosure relates to an electric-resistance-welded steel pipe or tube for hollow stabilizer, particularly to an electric-resistance-welded steel pipe or tube for hollow stabilizer where the formation of not only a ferrite decarburized layer but also a total decarburization layer can be suppressed even when heat treatment is performed in the air in a process of producing a hollow stabilizer so that a hollow stabilizer having excellent fatigue resistance can be obtained.

BACKGROUND

Automobiles are generally fitted with a stabilizer in order to suppress rolling of the automobile body at the time of cornering and improve driving stability at the time of high-speed driving. A solid stabilizer using a bar steel has been conventionally used as the stabilizer, but in recent years, a hollow stabilizer using a steel pipe or tube is generally adopted for weight reduction.

The hollow stabilizer is usually produced by cold forming a steel pipe or tube as a material into a desired shape, and then subjecting it to thermal refining treatment such as quenching and tempering. For example, a seamless steel pipe or tube or an electric-resistance-welded steel pipe or tube is used as the steel pipe or tube. Among them, the electric-resistance-welded steel pipe or tube, which is relatively inexpensive and has excellent dimensional accuracy, is widely used.

Such an electric-resistance-welded steel pipe or tube used as a material for hollow stabilizer (electric-resistance-welded steel pipe or tube for hollow stabilizer) is required to have excellent fatigue resistance after being formed into a stabilizer and undergoing heat treatment such as quenching and tempering. Therefore, various studies have been carried out on the effect of surface characteristics after heat treatment on fatigue resistance.

Especially, surface decarburization is considered to be an important factor among the surface characteristics. If surface decarburization occurs during a heating stage of quenching, surface hardness cannot be improved by the quenching. As a result, sufficient fatigue resistance cannot be obtained.

The following patent PTL 1 (WO2018079398) and PTL 2 (JP2007056283A) describe examples of technologies focusing on the relationship between surface decarburization and fatigue resistance.

PTL 1 proposes a method of producing an electric-resistance-welded steel pipe or tube for hollow stabilizer in which the thickness of a decarburized layer on the inner surface of the pipe or tube is suppressed to 120 μm or less.

In addition, PTL 2 proposes an electric-resistance-welded steel pipe or tube in which the formation of a ferrite decarburized layer during quenching is suppressed by adding at least one of Cu and Sb. Specifically, the thickness of the ferrite decarburized layer formed when the pipe or tube is heated at 800° C. for one hour in the air is suppressed to less than 0.15 mm.

CITATION LIST

Patent Literature

PTL 1: WO2018079398
PTL 2: JP2007056283A

SUMMARY

Technical Problem

As described above, in the electric-resistance-welded steel pipe or tube for hollow stabilizer proposed in PTL 1, the thickness of a decarburized layer on the inner surface of the pipe or tube is suppressed to 120 μm or less. However, the thickness of a decarburized layer, which is the focus of PTL 1, is a value of the steel pipe or tube before quenching rather than a value after quenching. It is considered necessary to reduce the thickness of a decarburized layer after quenching in order to further improve the fatigue resistance of a stabilizer, which is a final product. However, because the thickness of a decarburized layer after quenching is affected by quenching conditions, it cannot be said that the electric-resistance-welded steel pipe or tube for hollow stabilizer proposed in PTL 1 can sufficiently suppress surface decarburization during quenching.

Among the quenching conditions, the atmosphere of quenching is one factor that has a particularly large effect on the thickness of a decarburized layer after quenching. Heating during quenching is generally performed in the air from the viewpoint of productivity or the like. For example, electrical resistance heating is used as a heating method with short heating time and high productivity. In the electrical resistance heating, both ends of a stabilizer are clamped by electrodes, and electricity is applied between the electrodes to heat the stabilizer in the air. However, performing heating in the air as described above causes surface decarburization.

On the other hand, in order to suppress surface decarburization during quenching, a bright heat treatment furnace (non-oxidation heat treatment furnace) may be used to perform heating in an atmosphere containing no oxygen, for example. However, this method requires controlling of the atmosphere, resulting high equipment cost and inferior productivity.

Therefore, in order to further improve fatigue resistance, there is demand for technologies that can reduce the thickness of a decarburized layer after quenching even when heating is performed in the air.

On the other hand, the technology proposed in PTL 2 focuses on the thickness of a decarburized layer after quenching, yet it only describes the thickness of a ferrite decarburized layer (depth of a ferrite decarburized layer). However, the surface hardness after quenching is affected not only by the depth of a ferrite decarburized layer but also by the thickness of a total decarburized layer (depth of a total decarburized layer). Particularly when heating is performed in the air, the depth of a total decarburized layer increases. As a result, the fatigue resistance required for a stabilizer cannot be obtained.

It could thus be helpful to provide an electric-resistance-welded steel pipe or tube for hollow stabilizer where the formation of not only a ferrite decarburized layer but also a total decarburization layer can be suppressed even when heat treatment is performed in the air in a process of producing a hollow stabilizer so that a hollow stabilizer having excellent fatigue resistance can be obtained.

Solution to Problem

We engaged in intensive studies on the above problems and found the following (1) to (4).

(1) During the heating of a steel material, surface decarburization reaction occurs when carbon atoms in the steel diffuse outward toward the surface and react with oxygen. It is effective to increase the lattice parameter of iron to suppress the outward diffusion of carbon.

(2) Sb and Sn are the most effective elements for increasing the lattice constant of iron, while Cu is ineffective in increasing the lattice constant. PTL 2 proposes the addition of Cu to suppress decarburization. However, the addition of Cu is proposed because PTL 2 focuses only on ferrite decarburization and does not consider the suppression of total decarburization.

(3) PTL 2 also proposes the addition of Sb to suppress decarburization. As described above, Sb has the effect of increasing the lattice constant of iron, but Sb liquefies during heating and erodes austenite grain boundaries, which deteriorates the toughness of a stabilizer after quenching and tempering. Therefore, Sb needs to be added at a minimum necessary amount.

(4) FIG. 1 is a graph illustrating an example of the relationship between the Sn content and the depth of a total decarburized layer after quenching. Specifically, hot-rolled steel plates (plate thickness: 4 mm) with various Sn contents were held at 900° C. for 10 minutes in the air and then cooled at a cooling rate of about 20° C./s. Next, the depth of a total decarburized layer on the surface was measured. The chemical compositions other than Sn of the hot-rolled steel plates were kept constant as follows, C: 0.35%,
Si: 0.20%,
Mn: 1.22%,
P: 0.018%,
S: 0.0015%,
Al: 0.035%,
Cr: 0.15%,
Ti: 0.035%,
B: 0.0020%,
Ca: 0.0015%, and
N: 0.0022%,
with the balance being Fe and inevitable impurities.

As can be seen from the results illustrates in FIG. 1, the depth of a total decarburized layer can be suppressed to 150 μm or less when the Sn content is 0.010 mass % or more. However, the effect is saturated when the Sn content exceeds 0.05 mass %.

The present disclosure is based on the above discoveries and has the following primary features.

1. An electric-resistance-welded steel pipe or tube for hollow stabilizer, comprising a chemical composition containing (consisting of), in mass %,
C: 0.20% to 0.40%,
Si: 0.1% to 1.0%,
Mn: 0.1% to 2.0,
P: 0.1% or less,
S: 0.01% or less,
Al: 0.01% to 0.10%,
Cr: 0.01% to 0.50%,
Ti: 0.010% to 0.050%,
B: 0.0005% to 0.0050%,
Ca: 0.0001% to 0.0050%,
N: 0.0050% or less, and
Sn: 0.010% to 0.050%,
with the balance being Fe and inevitable impurities, wherein
depths of total decarburized layers on an inner surface and on an outer surface are 100 μm or less.

2. The electric-resistance-welded steel pipe or tube for hollow stabilizer according to 1., wherein the chemical composition further contains, in mass %,
Sb: 0.020% or less.

3. The electric-resistance-welded steel pipe or tube for hollow stabilizer according to 1. or 2., wherein the chemical composition further contains, in mass %, at least one selected from the group consisting of
Cu: 1.0% or less,
Ni: 1.0% or less,
Nb: 0.05% or less,
W: 0.5% or less,
V: 0.5% or less,
Mo: 0.2% or less, and
REM: 0.02% or less.

Advantageous Effect

According to the present disclosure, the formation of not only a ferrite decarburized layer but also a total decarburization layer can be suppressed even when heat treatment is performed in the air in a process of producing a hollow stabilizer. Therefore, a hollow stabilizer having excellent fatigue resistance can be produced by using the electric-resistance-welded steel pipe or tube of the present disclosure as a material. Further, according to the present disclosure, surface decarburization can be suppressed not only in high-cost heat treatment in a non-oxidizing atmosphere, but also in low-cost heat treatment in the air with excellent productivity. Therefore, the electric-resistance-welded steel pipe or tube for hollow stabilizer of the present disclosure can be used very suitably as a material for producing hollow stabilizers

BRIEF DESCRIPTION OF THE DRAWINGS

In the accompanying drawings:

FIG. 1 is a graph illustrating the relationship between the Sn content and the depth of a total decarburized layer after quenching.

DETAILED DESCRIPTION

The following describes an embodiment of the present disclosure.

[Chemical Composition]

The electric-resistance-welded steel pipe or tube for hollow stabilizer (hereinafter may be simply referred to as "electric-resistance-welded steel pipe or tube") of the present disclosure has the chemical composition described above. The following describes reasons for limiting the content of each component. Note that "%" refers to "mass %" unless otherwise noted.

C: 0.20% to 0.40%

C is an element that promotes the formation of martensite through the improvement of hardenability and that has an effect of dissolving in steel to increase the strength (hardness) of the steel. To secure the strength (hardness) required for a hollow stabilizer, the C content needs to be 0.20% or more. Therefore, the C content is set to 0.20% or more and preferably 0.21% or more. On the other hand, when the C content exceeds 0.40%, the risk of quench cracking increases, and the toughness after quenching decreases. Therefore, the C content is set to 0.40% or less, preferably 0.39% or less, and more preferably 0.38% or less.

Si: 0.1% to 1.0%

Si is an element that acts as a deoxidizer and also acts as a solid-solution-strengthening element. To obtain such effects, the Si content needs to be 0.1% or more. Therefore, the Si content is set to 0.1% or more and preferably 0.2% or more. On the other hand, when the Si content exceeds 1.0%, electric resistance weldability is deteriorated. Therefore, the Si content is set to 1.0% or less, preferably 0.8% or less, more preferably 0.5% or less, and further preferably 0.41% or less.

Mn: 0.1% to 2.0%

Mn is an element that dissolves in steel to improve the strength of the steel and that improves the hardenability of the steel. To secure the strength (hardness) required for a hollow stabilizer, the Mn content needs to be 0.1% or more. Therefore, the Mn content is set to 0.1% or more and preferably 0.5% or more. On the other hand, a Mn content exceeding 2.0% deteriorates toughness and increases the risk of quench cracking. Therefore, the Mn content is set to 2.0% or less, preferably 1.8% or less, and more preferably 1.7% or less.

P: 0.1% or less

P is an element contained in steel as an impurity, which segregates to grain boundaries or the like to deteriorate weld cracking resistance and toughness. Therefore, to be used in a hollow stabilizer, the P content needs to be reduced to 0.1% or less. Accordingly, the P content is set to 0.1% or less, preferably 0.05% or less, and more preferably 0.02% or less. On the other hand, from the viewpoint of weld cracking resistance and toughness, the P content is desirably as low as possible. Accordingly, no lower limit is placed on the P content, and the P content may be 0. However, an excessive reduction of the P content leads to an increase in production cost. Therefore, from the viewpoint of cost reduction, the P content is preferably set to 0.001% or more, more preferably 0.005% or more, and further preferably 0.008% or more.

S: 0.01% or less

S is an element that exists as sulfide inclusions in steel and deteriorates hot workability, toughness, and fatigue resistance. To be used in a hollow stabilizer, the S content needs to be reduced to 0.01% or less. Therefore, the S content is set to 0.01% or less, preferably 0.005% or less, and more preferably 0.003% or less. On the other hand, from the viewpoint of hot workability, toughness and fatigue resistance, the S content is desirably as low as possible. Accordingly, no lower limit is placed on the S content, and the S content may be 0. However, an excessive reduction of the S content leads to an increase in production cost. Therefore, from the viewpoint of cost reduction, the S content is preferably set to 0.0001% or more, more preferably 0.0005% or more, and further preferably 0.001% or more.

Al: 0.01% to 0.10%

Al is an element that acts as a deoxidizer and has an effect of ensuring the amount of solute B which is effective in improving hardenability by combining with N. Further, Al precipitates as AlN and has an effect of preventing coarsening of austenite grains during quenching heating. To obtain such effects, the Al content needs to be 0.01% or more. Therefore, the Al content is set to 0.01% or more. On the other hand, when Al is contained in a large amount exceeding 0.10%, the amount of oxide-based inclusions increases, and the fatigue life decreases. Accordingly, the Al content is set to 0.10% or less, preferably 0.07% or less, and more preferably 0.05% or less.

Cr: 0.01% to 0.50%

Cr is an element having an effect of improving hardenability. To obtain the effect, the Cr content is set to 0.01% or more and preferably 0.05% or more. On the other hand, when the Cr content exceeds 0.50%, oxides are likely to be formed, and Cr oxides remain in an electric resistance weld portion to deteriorate the electric resistance welding quality. Therefore, the Cr content is set to 0.50% or less, preferably 0.40% or less, and more preferably 0.30% or less.

Ti: 0.010% to 0.050%

Ti is an element having an effect of fixing N in steel as TiN. However, when the Ti content is less than 0.010%, the effect is not sufficiently exhibited. Therefore, the Ti content is set to 0.010% or more. On the other hand, when the Ti content exceeds 0.050%, the workability and the toughness of the steel deteriorate. Therefore, the Ti content is set to 0.050% or less and preferably 0.040% or less.

B: 0.0005% to 0.0050%

B is an element that can improve the hardenability of steel when added in a trace quantity. Further, B has an effect of strengthening grain boundaries and suppressing grain boundary embrittlement due to P segregation. To obtain such effects, the B content needs to be set to 0.0005% or more. Therefore, the B content is set to 0.0005% or more and preferably 0.0010% or more. On the other hand, adding B exceeding 0.0050% fails to increase the effect but is rather economically disadvantageous. Therefore, the B content is set to 0.0050% or less and preferably 0.0030% or less.

Ca: 0.0001% to 0.0050%

Ca is an element having an effect of controlling the morphology of sulfide inclusions to make them fine and approximately spherical. By adding Ca, the number of coarse MnS particles with a particle size of 10 μm or more and coarse TiS particles with a particle size of 10 μm or more which act as starting points of corrosion pits can be reduced. To obtain such effects, the Ca content is set to 0.0001% or more. On the other hand, when Ca is contained in a large amount exceeding 0.0050%, coarse CaS-based clusters are increased, which act as starting points of fatigue cracks to deteriorate corrosion fatigue resistance. Therefore, the Ca content is set to 0.0050% or less, preferably 0.0030% or less, and more preferably 0.0015% or less.

N: 0.0050% or less

N is an element inevitably contained as an impurity, which combines with nitride-forming elements in steel to contribute to suppressing coarsening of crystallized grains and increasing strength after tempering. However, a N content exceeding 0.0050% deteriorates the toughness of a welded portion. Therefore, the N content is set to 0.0050% or less and preferably 0.0040% or less. On the other hand, no lower limit is placed on the N content, and the N content may be 0. However, adding a certain amount of N can produce the above effects. Further, an excessive reduction of the N content leads to an increase in production cost. Therefore, from these viewpoints, the N content is preferably set to 0.001% or more and more preferably 0.0015% or more.

Sn: 0.010% to 0.050%

Sn is one of the most important elements in the present disclosure. The addition of Sn increases the lattice constant of iron, which suppresses the outward diffusion of carbon in steel, thus suppressing the surface decarburization reaction. To obtain such effects, it is necessary to add Sn in an amount of 0.010% or more. Therefore, the Sn content is set to 0.010% or more and preferably 0.020% or more. On the other hand, when Sn is added in an amount exceeding 0.050%, the effects are saturated. Therefore, the Sn content is set to 0.050% or less and preferably 0.045% or less.

An electric-resistance-welded steel pipe or tube according to one embodiment of the present disclosure has a chemical composition containing the aforementioned elements, with the balance being Fe and inevitable impurities.

In another embodiment of the present disclosure, the chemical composition may further optionally contain Sb in the amount described below.
Sb: 0.020% or less Sb, like Sn, is an element that increases the lattice constant of iron and has an effect of suppressing the outward diffusion of carbon in steel. Therefore, by containing Sb in addition to Sn, surface decarburization can be further suppressed. However, Sb liquefies during heating and erodes austenite grain boundaries, which deteriorates the toughness of a stabilizer after quenching and tempering. Therefore, Sb needs to be added in a minimum necessary amount. Accordingly, when Sb is added, the Sb content is set to 0.020% or less, preferably less than 0.010%, and more preferably 0.008% or less.

Further, in another embodiment of the present disclosure, the chemical composition may further optionally contain at least one selected from the group consisting of Cu, Ni, Nb, W, V, Mo and REM in the amounts described below.
Cu: 1.0% or less Cu is an element having effects of improving hardenability and improving corrosion resistance. However, because Cu is an expensive alloying element, a Cu content exceeding 1.0% significantly increases material cost. Therefore, the Cu content is set to 1.0% or less and preferably 0.50% or less. Although no lower limit is placed on the Cu content, the Cu content is preferably set to 0.05% or more when Cu is added, from the viewpoint of enhancing the effects of adding Cu.
Ni: 1.0% or less Ni, like Cu, is an element having effects of improving hardenability and improving corrosion resistance. However, because Ni is an expensive alloying element, a Ni content exceeding 1.0% significantly increases material cost. Therefore, the Ni content is set to 1.0% or less and preferably 0.50% or less. On the other hand, although no lower limit is placed on the Ni content, the Ni content is preferably set to 0.05% or more when Ni is added, from the viewpoint of enhancing the effects of adding Ni.
Nb: 0.05% or less Nb is an element that forms fine carbides to increase strength (hardness). However, a Nb content exceeding 0.05% does not increase the effects of adding Nb and thus fails to offer effects commensurate with the content, which is economically disadvantageous. Therefore, the Nb content is set to 0.05% or less and preferably 0.03% or less. On the other hand, although no lower limit is placed on the Nb content, the Nb content is preferably set to 0.001% or more when Nb is added, from the viewpoint of enhancing the effects of adding Nb.
W: 0.5% or less W, like Nb, is an element that forms fine carbides to increase strength (hardness). However, a W content exceeding 0.5% does not increase the effects of adding W and thus fails to offer effects commensurate with the content, which is economically disadvantageous. Therefore, the W content is set to 0.5% or less and preferably 0.3% or less. On the other hand, although no lower limit is placed on the W content, the W content is preferably set to 0.01% or more when W is added, from the viewpoint of enhancing the effects of adding W.
V: 0.5% or less V, like Nb and W, is an element that forms fine carbides to increase strength (hardness). However, a V content exceeding 0.5% does not increase the effects of adding V and thus fails to offer effects commensurate with the content, which is economically disadvantageous. Therefore, the V content is set to 0.5% or less and preferably 0.3% or less. On the other hand, although no lower limit is placed on the V content, the V content is preferably set to 0.01% or more when V is added, from the viewpoint of enhancing the effects of adding V.
Mo: 0.2% or less Mo is an element having an effect of improving hardenability. However, because Mo is a very expensive element, excessive addition leads to an increase in material cost. Therefore, the Mo content is set to 0.2% or less and preferably 0.15% or less. On the other hand, although no lower limit is placed on the Mo content, the Mo content is preferably set to 0.01% or more and more preferably 0.05% or more, from the viewpoint of enhancing the effects of adding Mo.
REM: 0.02% or less REM (rare earth metal), like Ca, is an element having an effect of controlling the morphology of sulfide inclusions to make them fine and approximately spherical. REM can optionally be added to complement the effect of Ca. However, a REM content exceeding 0.02% excessively increases the amount of inclusions which act as starting points of fatigue cracks, thereby deteriorating corrosion fatigue resistance. Therefore, the REM content is set to 0.02% or less and preferably 0.01% or less. On the other hand, although no lower limit is placed on the REM content, the REM content is preferably set to 0.001% or more when REM is added, from the viewpoint of enhancing the effects of adding REM.
[Depth of Total Decarburized Layer]
Depth of Total Decarburized Layer: 100 μm or Less In the electric-resistance-welded steel pipe or tube for hollow stabilizer of the present disclosure, both the depth of a total decarburized layer on the inner surface and the depth of a total decarburized layer on the outer surface are 100 μm or less. As used herein, the depth of a total decarburized layer refers to the depth of a total decarburized layer in an electric-resistance-welded steel pipe or tube for hollow stabilizer as a material before it is subjected to a process of producing a stabilizer (an open pipe or tube that is a cylindrical strip before welding). In other words, the depth of a total decarburized layer is a depth of a total decarburized layer before heat treatment such as quenching. The depth of a total decarburized layer can be measured with the method described in the Examples section.

When the depth of a total decarburized layer is more than 100 μm, the depth of a total decarburized layer will further increase in the subsequent heat treatment in a process of producing a stabilizer. As a result, the fatigue strength required for a stabilizer cannot be secured. The increase in the depth of a total decarburized layer is particularly pronounced when heat treatment is performed in the air. Therefore, the depths of total decarburized layers on the inner surface and on the outer surface of the electric-resistance-welded steel pipe or tube for hollow stabilizer need to be 100 μm or less, respectively, in order to obtain a hollow stabilizer with excellent fatigue resistance even when heat treatment is performed in the air in a process of producing a stabilizer. The depth of a total decarburized layer is preferably 50 μm or less and more preferably 20 μm or less.

On the other hand, no lower limit is placed on the depth of a total decarburized layer, and it may be, for example, 0 μm, because the depth of a total decarburized layer is preferably as small as possible. However, strictly controlled production conditions are required to completely prevent total decarburization. Therefore, from the viewpoint of ease of production, the depths of total decarburized layers on the inner surface and on the outer surface are preferably 1 μm or more and more preferably 5 μm or more.

The depth of a total decarburized layer is always larger than the depth of a ferrite decarburized layer. Therefore, when the depth of a total decarburized layer is 100 μm or less, the depth of a ferrite decarburized layer is also necessarily 100 μm or less. Accordingly, in the electric-resistance-welded steel pipe or tube for hollow stabilizer of the present disclosure, both the depths of ferrite decarburized layers on the inner surface and on the outer surface are 100 μm or less.

[t/D]

The size of the electric-resistance-welded steel pipe or tube for hollow stabilizer is not particularly limited, and it may be any size. However, a ratio of the wall thickness t (mm) to the outer diameter D (mm) of the steel pipe or tube represented by t/D is preferably set to 10% to 30%.

[Production Method]

The method of producing the electric-resistance-welded steel pipe or tube for hollow stabilizer of the present disclosure is not particularly limited, and any method may be used. That is, it can be produced with a conventional method using a steel material having the chemical composition described above. The following describes a suitable method of producing an electric-resistance-welded steel pipe or tube for hollow stabilizer according to one embodiment of the present disclosure.

The electric-resistance-welded steel pipe or tube for hollow stabilizer can be produced by subjecting a steel plate to electric resistance welding to obtain an electric-resistance-welded steel pipe or tube, reheating the electric-resistance-welded steel pipe or tube, and then subjecting the electric-resistance-welded steel pipe or tube to hot-diameter-reducing rolling. Any steel plate having the chemical composition described above can be used as the steel plate. The steel plate is preferably a hot-rolled steel plate.

The method of production of pipe or tube by electric resistance welding is not limited, and may be any method. For example, an electric-resistance-welded steel pipe or tube may be produced by subjecting the steel plate to continuous cold forming using a plurality of rolls to obtain an open pipe or tube having an approximately cylindrical shape, and then subjecting the open pipe or tube to electric resistance welding with its widthwise ends butted against each other by squeeze rolls to obtain an electric-resistance-welded steel pipe or tube. The electric resistance welding may be performed by, for example, high-frequency resistance welding or induction heating.

The development of surface decarburization is particularly pronounced at high temperatures above 1000° C. In processes of producing an electric-resistance-welded steel pipe or tube, heating to such a high temperature is usually performed only in a reheating process after producing a pipe or tube by electric resistance welding and before performing hot-diameter-reducing rolling. Therefore, the conditions such as reheating temperature and time in the reheating process may be adjusted so that the depth of a total decarburized layer of a finally obtained electric-resistance-welded steel pipe or tube for stabilizer satisfies the above conditions.

Particularly, the heating temperature (reheating temperature) during the reheating is preferably set to 850° C. to 1000° C. When the reheating temperature is lower than 850° C., the desired toughness in a welded portion may not be secured. On the other hand, when the reheating temperature exceeds 1000° C., surface decarburization becomes pronounced.

The rolling temperature in the hot-diameter-reducing rolling is preferably set to 650° C. or higher. When the rolling temperature is lower than 650° C., the workability may be deteriorated, rendering difficult to form the material into a desired stabilizer shape. The cumulative diameter reduction ratio in the hot-diameter-reducing rolling is preferably 30% to 90%. When the cumulative diameter reduction ratio is 30% to 90%, it is possible to obtain an electric-resistance-welded steel pipe or tube for hollow stabilizer with excellent workability.

Examples

Next, the present disclosure will be described in more detail based on Examples.

A hot-rolled steel plate (plate thickness: 4.5 mm) having the chemical composition listed in Table 1 was subjected to continuous cold forming using a plurality of rolls to obtain an approximately cylindrical open pipe or tube. Next, circumferential ends of the open pipe or tube were butted and pressed against each other and subjected to electric resistance welding using a high-frequency electric resistance welding method to obtain an electric-resistance-welded steel pipe or tube (89.1 mmφ in outer diameter×4.5 mm in thickness). Next, the obtained electric-resistance-welded steel pipe or tube was heated to 980° C. by induction heating and then subjected to diameter-reducing rolling to obtain an electric-resistance-welded steel pipe or tube for hollow stabilizer. The diameter-reducing rolling was performed under a set of conditions including a rolling temperature of 800° C. and a cumulative diameter reduction ratio of 71%. The rolling temperature was a temperature measured at the delivery side of a final rolling stand using a radiation thermometer. The dimension of the obtained electric-resistance-welded steel pipe or tube for hollow stabilizer was 25.4 mmφ in outer diameter×4.0 mm in thickness.

(Depth of Decarburized Layer Before Heat Treatment)

A test piece for microstructure observation was collected from the obtained electric-resistance-welded steel pipe or tube for hollow stabilizer so that a cross section parallel to the pipe or tube axial direction of the test piece was an observation surface, and the depth of a ferrite decarburized layer and the depth of a total decarburized layer on the inner and outer surfaces were measured according to the method specified in JIS G 0558.

(Depth of Decarburized Layer after Heat Treatment)

Next, the obtained electric-resistance-welded steel pipe or tube for hollow stabilizer was subjected to heat treatment in order to evaluate the depth of a decarburized layer after heat treatment. Specifically, the electric-resistance-welded steel pipe or tube for hollow stabilizer was first heated in an air-atmospheric furnace and held at 900° C. for 10 minutes, and then the pipe or tube was cooled at a cooling rate of 80° C./s±10° C./s for quenching. Next, it was subjected to tempering treatment in an air-atmospheric furnace at conditions of a tempering temperature of 350° C. and a holding time of 20 minutes. Next, a test piece for microstructure observation was collected from the electric-resistance-welded steel pipe or tube for hollow stabilizer after heat treatment so that a cross section perpendicular to the pipe or tube axial direction of the test piece was an observation surface, and the ferrite decarburized depth and the total decarburized depth were measured according to the method specified in JIS G 0558. The temperature of the steel pipe or tube during the heat treatment was measured using a K-thermocouple attached to the steel pipe or tube.

[Fatigue Resistance]

Next, the decrease of fatigue strength when heat treatment was performed in the air was evaluated by the following steps to confirm the effects of the present disclosure.

Step 1

First, the fatigue strength when heat treatment was performed in the air was evaluated by the following steps. A tubular test piece having a length of 400 mm was collected from the obtained electric-resistance-welded steel pipe or tube for hollow stabilizer, and the tubular test piece was subjected to quenching and tempering. The quenching was performed by holding the tubular test piece in an air-atmospheric furnace at 900° C. for 10 minutes, and then charging it into a quenching bath (water) to quench it at a cooling rate of 80° C./s±10° C./s. The tempering was performed under conditions of a tempering temperature of 350° C. and a holding time of 20 minutes. The tempering temperature was measured by a thermocouple attached to the test piece.

A torsional fatigue test was performed in the air using the tubular test piece after quenching and tempering, and the number of repetitions until cracking occurred (fatigue life) was determined. The torsional fatigue test was performed under conditions of a loading stress of ±400 MPa (completely reversed) and a loading cycle of 1 Hz.

The above test was performed on ten samples to obtain the average fatigue life.

Step 2

Next, a reference sample without surface decarburization was prepared by performing heat treatment under the same conditions as in Step 1, except that heating during quenching was performed in a non-oxidizing atmosphere furnace (bright heat treatment furnace), on an electric-resistance-welded steel pipe or tube for hollow stabilizer produced under the same conditions. Using the reference sample, a torsional fatigue test was performed under the same conditions as in Step 1. The average fatigue life of ten samples was determined.

Step 3

A reduction ratio of the average fatigue life determined in Step 1 with respect to the average fatigue life of the reference samples determined in Step 2 was calculated and used as the fatigue strength reduction ratio. When the fatigue strength reduction ratio is less than 10%, the result was judged to be good.

The results are listed in Table 2. For the electric-resistance-welded steel pipe or tube for hollow stabilizer that satisfied the conditions of the present disclosure, both the depth of a ferrite decarburized layer and the depth of a total decarburized layer on the inner surface and on the outer surface were 70 μm or less even after heat treatment at 900° C. for 10 minutes in the air.

In addition, all of the electric-resistance-welded steel pipes or tubes for hollow stabilizer that satisfied the conditions of the present disclosure had a fatigue strength reduction ratio of less than 10% when heat treatment was performed in the air.

TABLE 1

| Steel sample ID | Chemical composition (mass %)* | | | | | | | | | | |
|---|---|---|---|---|---|---|---|---|---|---|---|
| | C | Si | Mn | P | S | Al | N | Cr | Ti | B | Sn |
| A | 0.20 | 0.41 | 1.54 | 0.018 | 0.0020 | 0.0300 | 0.0035 | 0.01 | 0.012 | 0.0020 | 0.0110 |
| B | 0.21 | 0.11 | 1.35 | 0.018 | 0.0015 | 0.0300 | 0.0025 | 0.15 | 0.035 | 0.0018 | 0.0150 |
| C | 0.23 | 0.22 | 0.52 | 0.018 | 0.0025 | 0.0300 | 0.0035 | 0.30 | 0.015 | 0.0020 | 0.0250 |
| D | 0.26 | 0.22 | 1.25 | 0.018 | 0.0015 | 0.0300 | 0.0035 | 0.15 | 0.035 | 0.0018 | 0.0300 |
| E | 0.35 | 0.22 | 1.23 | 0.018 | 0.0018 | 0.0350 | 0.0020 | 0.18 | 0.035 | 0.0015 | 0.0250 |
| F | 0.40 | 0.40 | 1.52 | 0.018 | 0.0025 | 0.0120 | 0.0035 | 0.15 | 0.015 | 0.0020 | 0.0450 |
| G | 0.19 | 0.41 | 1.78 | 0.018 | 0.0020 | 0.0300 | 0.0035 | 0.01 | 0.012 | 0.0020 | 0.0200 |
| H | 0.20 | 0.22 | 1.35 | 0.018 | 0.0015 | 0.0300 | 0.0025 | 0.15 | 0.035 | 0.0018 | 0.0150 |
| I | 0.23 | 0.22 | 0.21 | 0.018 | 0.0025 | 0.0300 | 0.0035 | 0.30 | 0.015 | 0.0020 | 0.0250 |
| J | 0.26 | 0.22 | 1.25 | 0.018 | 0.0015 | 0.0300 | 0.0035 | 0.15 | 0.035 | 0.0018 | 0.0300 |
| K | 0.35 | 0.22 | 1.23 | 0.018 | 0.0018 | 0.0350 | 0.0020 | 0.18 | 0.035 | 0.0006 | 0.0250 |
| L | 0.38 | 0.75 | 1.52 | 0.018 | 0.0025 | 0.0480 | 0.0035 | 0.15 | 0.015 | 0.0020 | 0.0450 |
| M | 0.35 | 0.22 | 1.25 | 0.018 | 0.0050 | 0.0300 | 0.0035 | 0.20 | 0.015 | 0.0020 | — |
| N | 0.26 | 0.22 | 1.25 | 0.018 | 0.0050 | 0.0300 | 0.0035 | 0.20 | 0.015 | 0.0020 | 0.0090 |
| O | 0.35 | 0.22 | 1.52 | 0.018 | 0.0050 | 0.0300 | 0.0035 | 0.20 | 0.015 | 0.0020 | 0.0005 |
| P | 0.26 | 0.22 | 1.25 | 0.018 | 0.0015 | 0.0300 | 0.0035 | 0.15 | 0.035 | 0.0018 | 0.0090 |
| Q | 0.26 | 0.22 | 1.25 | 0.018 | 0.0015 | 0.0300 | 0.0035 | 0.15 | 0.035 | 0.0018 | 0.0005 |

| Steel sample ID | Chemical composition (mass %)* | | | | | | | | | Remarks |
|---|---|---|---|---|---|---|---|---|---|---|
| | Sb | Mo | W | Nb | V | Ni | Cu | Ca | REM | |
| A | — | — | — | 0.02 | — | — | 0.15 | 0.0001 | — | Conforming steel |
| B | — | — | — | 0.01 | — | — | — | 0.0001 | — | Conforming steel |
| C | — | — | — | — | — | — | — | 0.0012 | — | Conforming steel |
| D | — | — | — | — | — | — | — | 0.0012 | — | Conforming steel |
| E | — | — | — | — | — | — | — | 0.0012 | — | Conforming steel |
| F | — | — | — | — | — | — | — | 0.0012 | — | Conforming steel |
| G | 0.0070 | — | — | — | — | — | — | 0.0012 | — | Conforming steel |

TABLE 1-continued

| | | | | | | | | | | |
|---|---|---|---|---|---|---|---|---|---|---|
| H | 0.0100 | — | — | — | — | — | — | 0.0012 | — | Conforming steel |
| I | 0.0150 | 0.10 | 0.1 | — | — | — | — | 0.0012 | — | Conforming steel |
| J | 0.0120 | — | — | 0.01 | 0.10 | — | — | 0.0012 | — | Conforming steel |
| K | 0.0060 | — | — | — | — | 0.10 | 0.1 | 0.0012 | — | Conforming steel |
| L | 0.0120 | — | — | — | — | — | — | 0.0012 | 0.0010 | Conforming steel |
| M | — | — | — | — | — | — | — | 0.0012 | — | Comparative steel |
| N | 0.0002 | — | — | — | — | — | — | 0.0012 | — | Comparative steel |
| O | — | — | — | — | — | — | — | 0.0012 | — | Comparative steel |
| P | — | — | — | — | — | — | — | 0.0012 | — | Comparative steel |
| Q | — | — | — | — | — | — | — | 0.0012 | — | Comparative steel |

*The balance is Fe and inevitable impurities.

TABLE 2

| | | Depth of decarburized layer before heat treatment (μm) | | | | Depth of surface decarburized layer after heat treatment (μm) | | | | | |
|---|---|---|---|---|---|---|---|---|---|---|---|
| | | Outer surface of pipe or tube | | Inner surface of pipe or tube | | Outer surface of pipe or tube | | Inner surface of pipe or tube | | | |
| No. | Steel sample ID | Ferrite decarburized layer | Total decarburized layer | Ferrite decarburized layer | Total decarburized layer | Ferrite decarburized layer | Total decarburized layer | Ferrite decarburized layer | Total decarburized layer | Fatigue strength reduction ratio (%) | Remarks |
| 1 | A | 0 | 10 | 0 | 10 | 5 | 60 | 0 | 60 | 1 | Example |
| 2 | B | 0 | 10 | 0 | 10 | 0 | 60 | 0 | 70 | 1 | Example |
| 3 | C | 0 | 20 | 0 | 20 | 10 | 45 | 5 | 50 | 2 | Example |
| 4 | D | 0 | 10 | 0 | 10 | 0 | 45 | 0 | 55 | 3 | Example |
| 5 | E | 0 | 90 | 0 | 90 | 0 | 95 | 0 | 95 | 5 | Example |
| 6 | F | 0 | 5 | 0 | 5 | 5 | 30 | 0 | 40 | 2 | Example |
| 7 | G | 0 | 5 | 0 | 5 | 0 | 45 | 5 | 55 | 1 | Example |
| 8 | H | 0 | 10 | 0 | 10 | 5 | 45 | 0 | 55 | 1 | Example |
| 9 | I | 0 | 5 | 0 | 5 | 0 | 45 | 0 | 60 | 3 | Example |
| 10 | J | 0 | 10 | 0 | 10 | 0 | 35 | 0 | 45 | 2 | Example |
| 11 | K | 0 | 5 | 0 | 5 | 0 | 40 | 0 | 50 | 2 | Example |
| 12 | L | 0 | 10 | 0 | 10 | 0 | 30 | 0 | 40 | 3 | Example |
| 15 | M | 10 | 110 | 5 | 110 | 10 | 140 | 5 | 180 | 30 | Comparative example |
| 16 | N | 5 | 150 | 5 | 160 | 5 | 150 | 5 | 200 | 40 | Comparative example |
| 17 | O | 10 | 150 | 10 | 170 | 10 | 150 | 10 | 250 | 35 | Comparative example |
| 18 | P | 10 | 160 | 10 | 160 | 10 | 160 | 10 | 240 | 40 | Comparative example |
| 19 | Q | 10 | 160 | 10 | 170 | 10 | 150 | 10 | 260 | 45 | Comparative example |

The invention claimed is:

1. An electric-resistance-welded steel pipe or tube for a hollow stabilizer, comprising a chemical composition containing, in mass %,
C: 0.20% to 0.40%,
Si: 0.1% to 1.0%,
Mn: 1.23% to 2.0%,
P: 0.1% or less,
S: 0.01% or less,
Al: 0.01% to 0.10%,
Cr: 0.01% to 0.50%,
Ti: 0.010% to 0.050%,
B: 0.0005% to 0.0050%,
Ca: 0.0001% to 0.0050%,
N: 0.0050% or less, and
Sn: 0.020% to 0.050%,
with a balance being Fe and inevitable impurities, wherein
depths of total decarburized layers on an inner surface and on an outer surface are 50 μm or less.

2. The electric-resistance-welded steel pipe or tube for a hollow stabilizer according to claim 1, wherein the chemical composition further contains, in mass %,
Sb: 0.020% or less.

3. The electric-resistance-welded steel pipe or tube for a hollow stabilizer according to claim 1, wherein the chemical composition further contains, in mass %, at least one selected from the group consisting of
Cu: 1.0% or less,
Ni: 1.0% or less, Nb: 0.05% or less,
W: 0.5% or less,
V: 0.5% or less,
Mo: 0.2% or less, and
REM: 0.02% or less.

4. The electric-resistance-welded steel pipe or tube for a hollow stabilizer according to claim 2, wherein the chemical composition further contains, in mass %, at least one selected from the group consisting of Cu: 1.0% or less,
Ni: 1.0% or less,
Nb: 0.05% or less,
W: 0.5% or less,
V: 0.5% or less,
Mo: 0.2% or less, and
REM: 0.02% or less.

* * * * *